United States Patent
Groves et al.

(10) Patent No.: US 11,078,028 B1
(45) Date of Patent: Aug. 3, 2021

(54) SYSTEM AND METHODS FOR CONVEYING PARTS

(71) Applicant: Honda Motor Co., Ltd., Tokyo (JP)

(72) Inventors: Paul Edward Groves, Alliston (CA); Raymond Ludwig Bennoit, Stayner (CA); Andrew Scott Schlueter, Angus (CA); Kyle William Sloan, Barrie (CA); Christopher Allan McNab, Durham (CA)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/836,423

(22) Filed: Mar. 31, 2020

(51) Int. Cl.
*B65G 47/22* (2006.01)
*B65G 27/04* (2006.01)
*B65G 51/03* (2006.01)
*B65G 27/32* (2006.01)
*B25J 9/16* (2006.01)
(Continued)

(52) U.S. Cl.
CPC ............ *B65G 47/22* (2013.01); *B25J 9/1687* (2013.01); *B65G 27/02* (2013.01); *B65G 27/04* (2013.01); *B65G 27/32* (2013.01); *B65G 47/256* (2013.01); *B65G 51/03* (2013.01); *B65G 2203/0208* (2013.01); *B65G 2203/0216* (2013.01); *B65G 2203/0225* (2013.01); *B65G 2203/041* (2013.01)

(58) Field of Classification Search
CPC ........ B65G 27/02; B65G 27/04; B65G 27/32; B65G 47/1421; B65G 47/145; B65G 47/256; B65G 51/03; B65G 2203/0208; B65G 2203/0216; B65G 2203/0225; B65G 2203/041; B23P 19/002; B23P 19/004; B23P 19/005; B25J 9/1687
See application file for complete search history.

(56) References Cited

U.S. PATENT DOCUMENTS

| 3,568,229 A | 3/1971 | Moore et al. |
| 5,191,960 A * | 3/1993 | Wareham ............... B23P 19/004 198/389 |

(Continued)

FOREIGN PATENT DOCUMENTS

| CN | 107323967 A | 11/2017 |
| CN | 108408368 A | 8/2018 |

(Continued)

*Primary Examiner* — Gene O Crawford
*Assistant Examiner* — Keith R Campbell
(74) *Attorney, Agent, or Firm* — Armstrong Teasdale LLP

(57) ABSTRACT

A method and system for an automatic parts conveying system includes a parts feeder configured to receive parts from a receiving bin, a linear conveyor for conveying parts away from the parts feeder to an installation robot. The installation robot includes a robot arm controlled by a controller and a parts handling device coupled to a distal end of the robot arm. The automatic parts conveying system also includes one or more vibrating elements positioned along at least one of the linear conveyor, the parts feeder, and the receiving bin to impart vibratory motions to the at least one of the linear conveyor, the parts feeder, and the receiving bin for stimulating the parts into motion. The automatic parts conveying system also includes an air assist portion configured to provide pressurized fluid to the parts to facilitate moving parts through the automatic parts conveying system.

16 Claims, 5 Drawing Sheets

(51) Int. Cl.
  *B65G 47/256*  (2006.01)
  *B65G 27/02*  (2006.01)

(56) References Cited

U.S. PATENT DOCUMENTS

| | | | |
|---|---|---|---|
| 5,269,440 A | | 12/1993 | Bohnert et al. |
| 5,630,497 A | | 5/1997 | Graham |
| 5,638,940 A | * | 6/1997 | Aoyama ............... B23P 19/005 |
| | | | 198/493 |
| 6,102,193 A | * | 8/2000 | Rivers, Jr. ............. B23P 19/002 |
| | | | 198/468.5 |
| 6,105,753 A | * | 8/2000 | Graham ................. B65G 27/30 |
| | | | 198/763 |
| 6,161,675 A | | 12/2000 | Graham |
| 6,450,320 B1 | * | 9/2002 | Turek ................. B65G 47/1421 |
| | | | 198/380 |
| 7,553,110 B2 | * | 6/2009 | Minami ............... B65G 47/525 |
| | | | 406/75 |
| 8,640,852 B2 | * | 2/2014 | Seki .......................... B07C 5/34 |
| | | | 198/392 |
| 10,017,329 B2 | * | 7/2018 | Seitel ................. B65G 47/1435 |
| 2003/0042112 A1 | * | 3/2003 | Woerner ............ B65G 47/1471 |
| | | | 198/446 |

FOREIGN PATENT DOCUMENTS

| | | |
|---|---|---|
| CN | 208249234 U | 12/2018 |
| CN | 209110513 U | 7/2019 |
| JP | 2003292143 A | 10/2003 |
| KR | 20070021554 A | 2/2007 |

* cited by examiner

SYSTEM AND METHODS FOR CONVEYING PARTS

BACKGROUND

During manufacturing processes, it is often necessary to convey parts used in the manufacturing process between a receiving station, a storage location, and intermediate stations where parts are assembled into a unit being manufactured. A conveyor system is often used to automatically receive the parts and to manipulate the parts into a desired orientation for feeding to an assembly device that installs the parts onto the unit being manufactured. Because the conveying process is intended to operate free of manual inputs and corrections, it is important that equipment used in the conveying process to be able to maintain the flow of parts through the conveyor and feeder without manual intervention. To provide the motive force to move the parts along a conveying path, at least some known conveyor systems use a combination of vibrations and gravity. However, depending on the size and quantity of parts, the vibrations may be insufficient to maintain a continuous flow of parts. As such it would be desirable to sense flow abnormalities and automatically assist the vibration elements to maintain the flow of parts.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, an automatic parts conveying system includes a parts feeder configured to receive parts from a receiving bin, a linear conveyor for conveying parts along a path extending from the parts feeder to an installation robot. The automatic parts conveying system also includes one or more vibrating elements positioned along at least one of the linear conveyor, the parts feeder, and the receiving bin to impart vibratory motions to the at least one of the linear conveyor, the parts feeder, and the receiving bin for stimulating the parts into motion. The automatic parts conveying system also includes an air assist portion configured to provide pressurized fluid to the parts to facilitate moving parts through the automatic parts conveying system.

In another aspect, a method of automatically conveying parts in an assembly process includes receiving a plurality of parts in a random orientation, motivating the parts into a stream of parts using a vibrating element, detecting parts in the stream of parts that are misoriented, and rejecting the misoriented parts using a flow of air.

In yet another aspect, an assembly line includes a linear conveyor for conveying parts along a path to an installation robot. The assembly line also includes one or more vibrating elements positioned along the linear conveyor for imparting vibratory motions to the linear conveyor for stimulating the parts into a stream having linear motion along the linear conveyor, and an air assist portion configured to provide pressurized fluid to the parts to facilitate moving parts along the linear conveyor.

Various refinements exist of the features noted above in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

FIG. 1 is a perspective view of an exemplary assembly line including an automatic parts conveying system in accordance with the present embodiment.

FIG. 2 is an enlarged view of an exemplary parts feeder used with the conveying system shown in FIG. 1.

FIG. 3 is a side elevational view of a portion of an exemplary linear conveyor and air assist portion used with the conveying system shown in FIG. 1.

FIG. 4 is a plan view of a portion of the linear conveyor and air assist portion shown in FIG. 3.

FIG. 5 is an alternative plan view of the portion of the linear conveyor and air assist portion shown in FIG. 4.

FIG. 6 is a side elevational view of an exemplary part and an exemplary orientation sensor that may be used with the automatic parts conveying system shown in FIG. 1 to determine whether the part is in a proper orientation.

FIG. 7 is a schematic view of an exemplary part rejector that may be used with the automatic parts conveying system shown in FIG. 1.

FIG. 8 is a schematic diagram of a control circuit that may be used in the system shown in FIG. 1.

FIG. 9 is a flow chart of an exemplary method of automatically conveying parts in an assembly process.

Figure 1:
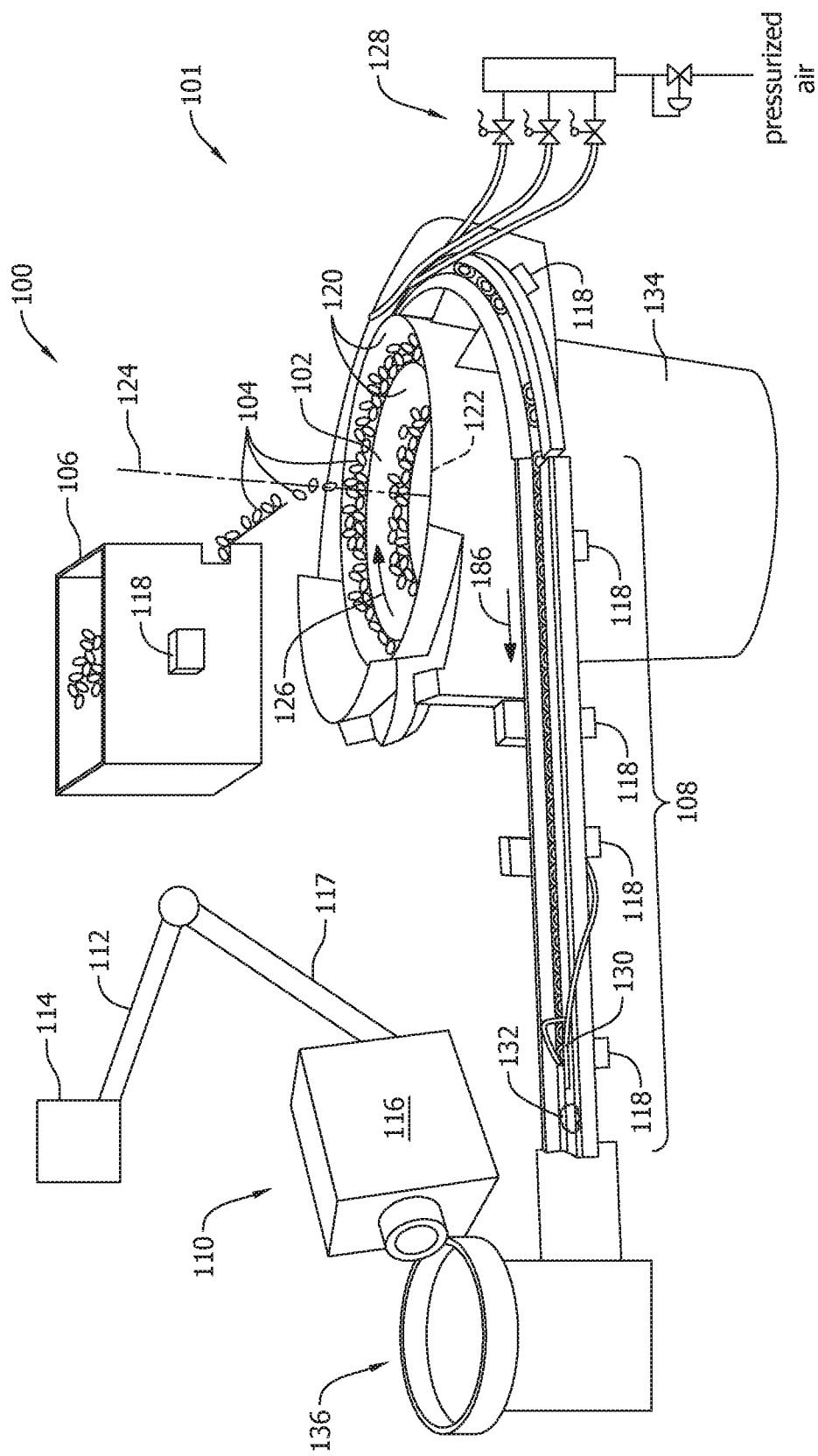
FIGS. 1-9 show exemplary embodiments of the methods and systems described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates exemplary embodiments of the disclosure by way of example and not by way of limitation. It is contemplated that the disclosure has general application to testing components during an assembly process.

Embodiments of an exemplary automatic parts conveyor and method of operating the automatic parts conveyor are described herein. The automatic parts conveyor may receive parts, for example, such as, elastomeric grommets from a receiving bin, separate the parts into a stream of individual parts such that a predetermined spacing is defined between adjacent parts, reject and recycle parts that are misoriented, and direct the stream of properly-oriented parts to a feeder, such as, a robot feeder, which can then install those parts in a downstream process.

Because the parts may be received in bulk via a box or bag of identical parts, the orientation of the parts may be random in the receiving bin. Several methods of getting the parts into the proper orientation may be used. For example, the parts may be metered onto a vibrating table that facilitates spreading the parts while orienting them onto an obverse or reverse face. Once on their obverse or reverse face, the parts may then be funneled through a gate that aligns the parts in a direction of travel into a conveying chute through which the parts are guided to the feeder.

Along the way through the conveying chute, the parts are properly oriented based on a feature discernible on the part. The feature, known as an orientation feature may have a certain dimension, shape, protuberance, recess, and/or any combinations thereof. Additionally, the orientation feature may include a visibly discernible feature such as a color, a bar code, or any other indicia recognized by a camera system to determine whether the part is oriented properly. Parts that are not oriented properly may be manipulated into the desired orientation or may be rejected to a recycle bin, from where the parts eventually are returned to the receiving bin.

In some cases, the surrounding environment in which the conveying process operates is not sufficiently controlled, and a physical characteristic of the parts may be altered temporarily. For example, some elastomers, such as, various forms of rubber, and the like, may become sticky when warmed beyond a certain temperature. Such stickiness may adversely affect the ability of the conveying system to move the affected parts efficiently. To facilitate continued efficient conveyance of the parts, the conveyor and/or feeder may include various sensors that detect parts that are stuck in the process, that are not moving through the process as quickly as expected, and/or that are misoriented for the particular process.

The following description refers to the accompanying drawings, in which, in the absence of a contrary representation, the same numbers in different drawings represent similar elements.

FIG. 1 is a perspective view of an exemplary assembly line 100 including an automatic parts conveying system 101 in accordance with the present embodiment. In the exemplary embodiment, automatic parts conveyor 101 includes a parts feeder 102 oriented to receive parts 104, such as, elastomeric grommets, from a receiving bin 106. Automatic parts conveyor 101 also includes a linear conveyor 108 for conveying parts 104 discharged from parts feeder 102 to an installation robot 110. Installation robot 110 includes a robot arm 112 that is controlled by a controller 114, and a grommet handling device 116 that is coupled to a distal end 117 of robot arm 112. One or more vibrating elements 118 may be positioned along linear conveyor 108, parts feeder 102 and/or receiving bin 106 to impart vibratory motions to the components, thus inducing the stream of parts into motion. Vibrating elements 118 may provide a vibratory motion in a single direction, a torsional direction, or may provide a random vibratory motion in multiple directions. The vibratory motion may be constant, intermittent, or timed in a distinct pattern. The vibratory motion may be altered in frequency to achieve a desired movement of parts 104. For example, a higher frequency vibration may provide sufficient force to maintain certain parts 104 moving, but a lower frequency and higher power vibration may be required to start the flow of other parts 104 or to dislodge any stuck parts 104. The frequency of the vibratory motion may be varied to adjust a speed of conveying of parts 104. A carousel assembly 120 within parts feeder 102 and a vibrating table 122 may revolve around axis 124 or around a different axis to provide additional drive to maintain a force on parts 104 in a direction of travel 126.

An air assist portion 128 directs pressurized fluid towards the stream of parts 104 traveling along a path of receiving bin 106, vibrating table 122, carousel assembly 120, parts feeder 102, and linear conveyor 108 to assist in conveying parts 104. In the exemplary embodiment, air assist portion 128 also includes a plurality of targeted nozzles 130 directed to predetermined or discovered conveying problem areas 132 (Only one shown in FIG. 1).

During operation, parts 104 are received in receiving bin 106 where they can be held until metered onto vibrating table 122 or another area of parts feeder 102. Parts 104 are picked up by carousel assembly 120. Parts 104 that are detected as being misoriented are rejected to a recycle bin 134. Properly-oriented parts 104 are directed onto linear conveyor 108, which carries those parts 104 to a robot feeder 136. Robot feeder 136 permits loading of the stream of individual parts 104 into grommet handling device 116 in the proper orientation for efficient installation in, for example, a car or other vehicle, electrical panel, or the like. In instances where parts 104 become stuck traveling along from receiving bin 106 to robot feeder 136, air may be used to assist vibrating elements 118 in dislodging those parts 104.

Figure 2:
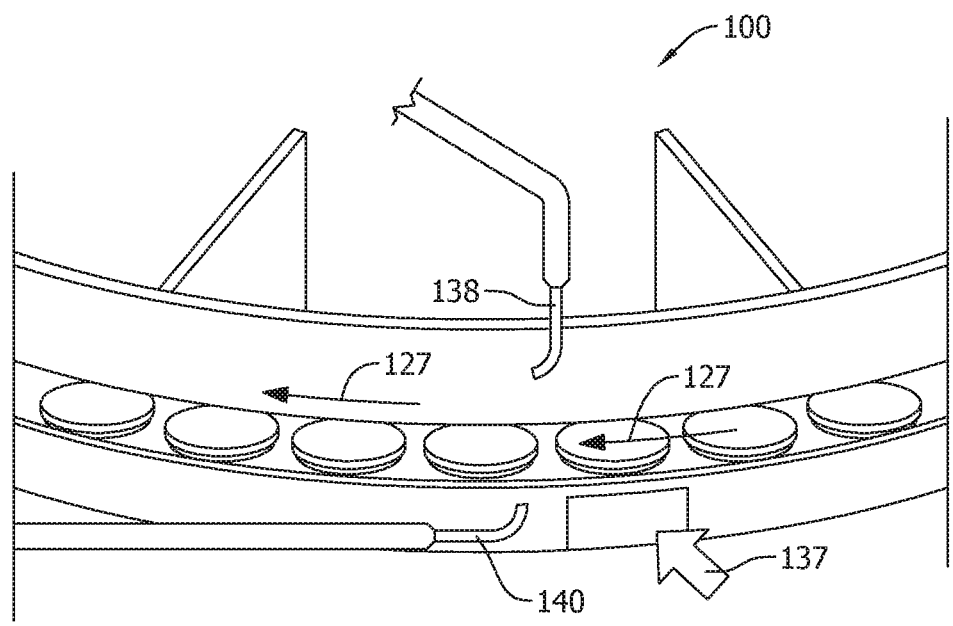

FIG. 2 is an enlarged view of parts feeder 102. As shown in FIG. 2, parts feeder 102 may be torsionally vibrated in the direction of the arrow 137, such that forces in a traveling direction 127 are exerted. Through the combination of these two forces, parts 104 are conveyed in traveling direction 127 shown by arrow 137. Other vibrating elements 118 may induce other forces to improve conveyance of parts 104. In addition, air nozzles 138 and 140 assist in maintaining the flow of parts 104. In various embodiments, vibrating elements 118 (shown in FIG. 1) and targeted nozzles 130 cooperate during periods of normal travel of parts 104 along parts feeder 102 and linear conveyor 108. During periods of abnormal flow, such as when parts 104 become sticky, misaligned, misoriented, or for other reasons, vibrating elements 118 and targeted nozzles 130 do also cooperate, but in a different manner than when parts 104 are traveling normally.

Figure 3:
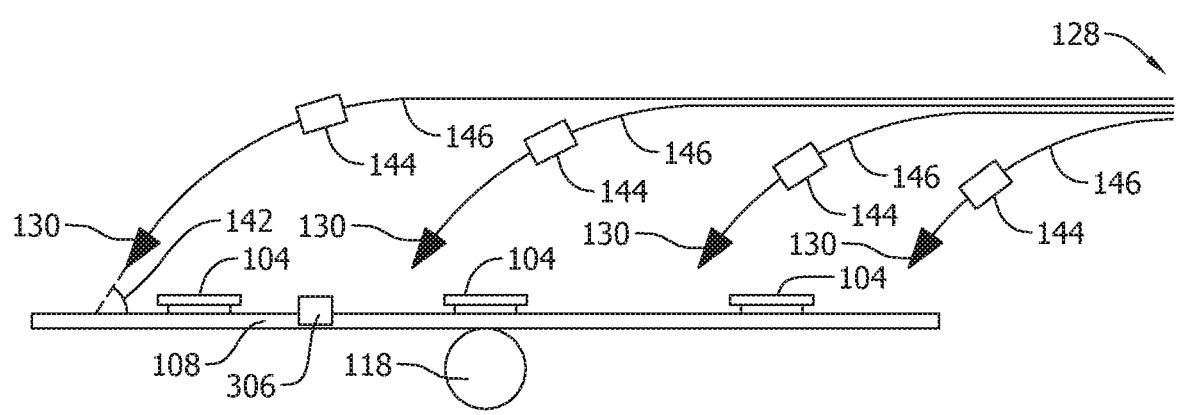

FIG. 3 is a side elevational view of a portion of linear conveyor 108 and air assist portion 128. Movement of parts 104 along linear conveyor 108 is supported by at least one vibrating element 118 and by targeted nozzles 130. Each targeted nozzle 130 directs a flow of fluid, generally air, to a predetermined location along linear conveyor 108. Each targeted nozzle 130 is oriented at a desired angle with respect to linear conveyor 108 to get a desired affect. For example, an angle 142 may be selected to change a speed of parts 104 moving down linear conveyor 108. Angle 142 may be variably selected to "steer" parts 104 in linear conveyor 108. A fluid flow through targeted nozzles 130 may be balanced using a flow restrictor 144 coupled to each air supply line 146. A sensor 306 may be used to detect the travel of parts 104 or may also detect an absence of a continuous flow of parts 104. Data from sensor 306 may be coordinated with other data gathered from automatic parts conveying system 101 to generate an alert and to alter the control of air assist portion 128. For example, if during certain time periods of the feeding process, it is expected there is to be an absence of the flow of parts 104, an alert may not be generated and/or the fluid flow may not be changed.

Figure 4:
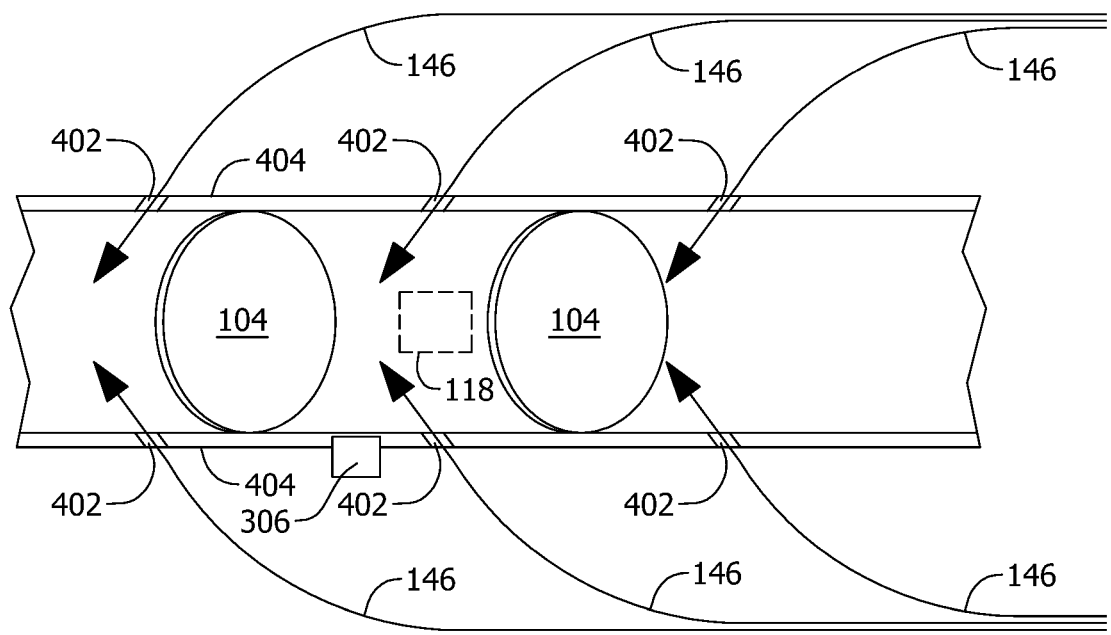

FIG. 4 is a plan view of a portion of linear conveyor 108 and air assist portion 128, in another aspect. In the exemplary embodiment, air is directed through apertures 402 defined in a sidewall 404 of linear conveyor 108. Apertures 402 may be oriented at any angle with respect to sidewall 404 to enable air to be directed from air supply lines 146 into the stream of parts 104. More specifically, the air may be directed into the path to provide a motive force for parts 104 or to dislodge a blockage of stuck parts 104. Moreover, the air may be directed into the path in a continuous flow, a pulsed flow based on a predetermined periodicity, a pulsed flow based on a predetermined variable schedule, or any other variable schedule that facilitates operation of conveyor 108. Furthermore, such air may be directed into the path at a variably selectable pressure or in accordance with a predetermined flow rate. The selectable pressure or flow rate may be based on, for example, a time period that a blockage is occurring. For example, the longer time duration that a blockage persists, a pressure or flow rate may be increased, the periodicity of a pulsed flow may be changed, and/or the flow may be changed from continuous to pulse, or vice versa.

Figure 5:
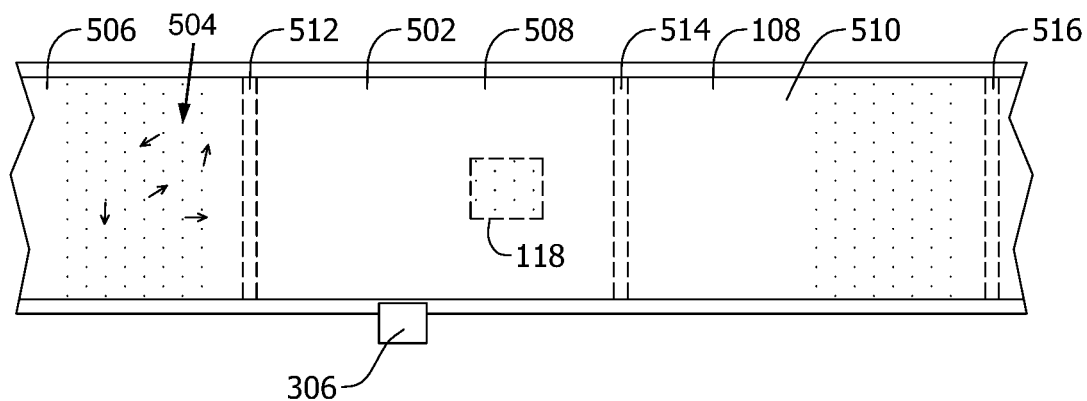

FIG. 5 is a plan view of the portion of linear conveyor 108 and air assist portion 128 shown in FIG. 4 and in another aspect. In this aspect, a transport surface 502 of linear conveyor 108 includes a plurality of holes 504 defined therein that extend through transport surface 502 to one or more plenums 506, 508, and 510 formed below transport surface 502 and separated from each other by respective plenum walls 512, 514, and 516. Alternatively, any number of plenums 506 may be used that facilitates operation of conveyor 108. Each plenum 506, 508, and/or 510, if more than one is included, may be controlled individually with respect to air flow direction, periodicity, pressure, flow rate and the like by air assist portion 128, as described above. Air assist portion 128 provides a source of pressurized air in fluid communication with holes 504. Pressurized air exiting holes 504 may enable parts 104 to pass over transport surface 502 with very little friction, in a manner comparable to an "air hockey" style surface that creates an air bearing, or cushion of air extending between transport surface 502 and an underside of parts 104 so that parts 104 have a reduced friction engagement with transport surface 502, and thus slide easily through linear conveyor 108 to downstream processes.

Figure 6:
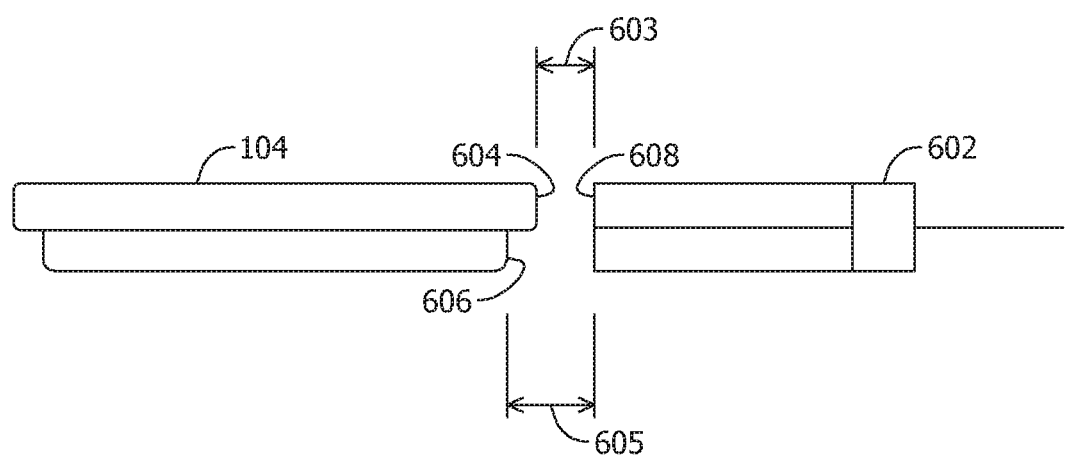

FIG. 6 is a side elevational view of an exemplary part 104 and an orientation sensor 602 that may be used with automatic parts conveying system 101 to determine whether a part 104 is in a proper orientation for handling by robot feeder 136. In one embodiment, orientation sensor 602 is able to discern an orientation of part 104 by proximity. More specifically, a distance 603 detected between a surface 604 and a face 608 of sensor 602 and a distance 605 between a surface 606 and face 608 may be compared to determine if part 104 is oriented properly. Alternatively, other types of sensors may also be used. In addition, sensor 602 may include a single sensing element or may include more than one sensor, either packaged separately or packaged together as a single unit.

Figure 7:
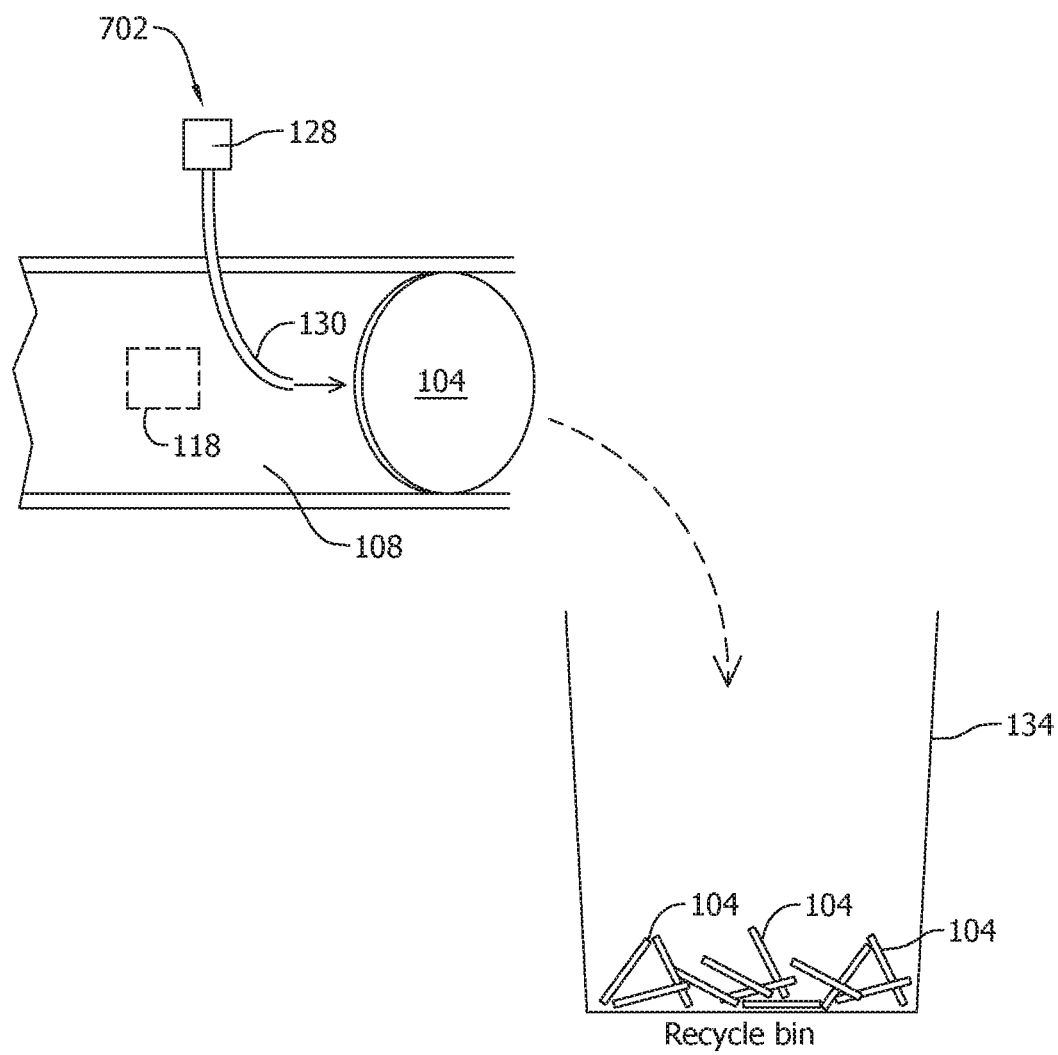

FIG. 7 is a schematic view of a part rejector assembly 702 that may be used with automatic parts conveying system 101. Air assist portion 128 provides pressurized fluid to targeted nozzles 130 to assist in motivating parts 104 along the path of receiving bin 106, to vibrating table 122, towards carousel assembly 120, to parts feeder 102, and/or to linear conveyor 108. Targeted nozzles 130 may also be used to remove rejected parts 104 from the stream of parts 104 and deposit them into recycle bin 134.

Figure 8:
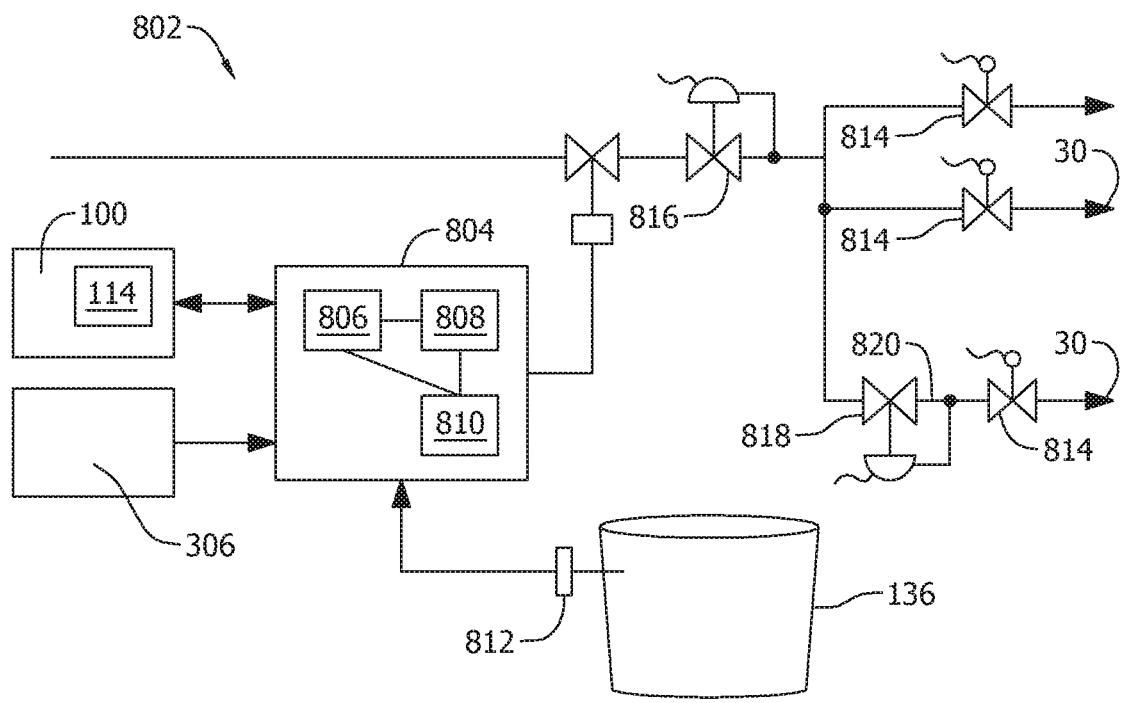

FIG. 8 is a schematic diagram of a control circuit 802 that may be used with air assist portion 128. In the exemplary embodiment, control circuit 802 includes a controller 804 including a processor 806 communicatively coupled to a memory device 808 and a database structure 810. Controller 804 may receive, as inputs, signals from various sensors used by automatic parts conveying system 101. For example, controller 804 may receive signals from bin level sensors 812, movement sensors 306 that detect whether parts 104 are moving in a stream or are struck, and status and control signals from automatic parts conveying system 101. Controller 804 also generates and transits signals based on the received signals and data stored in memory device 808 and database structure 810. The transmitted signals are used to control air assist portion 128 to provide fluid to nozzles 30 at the correct pressure, flow, periodicity, if intermittent, and other parameters associated with air assist portion 128. Controllable valves, such as, solenoid vales 814 may be used to control fluid flow to one or more associated air nozzles 30. Air pressure in air assist portion 128 may be adjustable via electrically adjustable pressure control valves 816 and 818. Pressure control valve 816 may be used to control air pressure throughout pressure control valves 816 and pressure control valve 81 may be used to control air pressure in one leg 820 of air assist portion 128.

Figure 9:
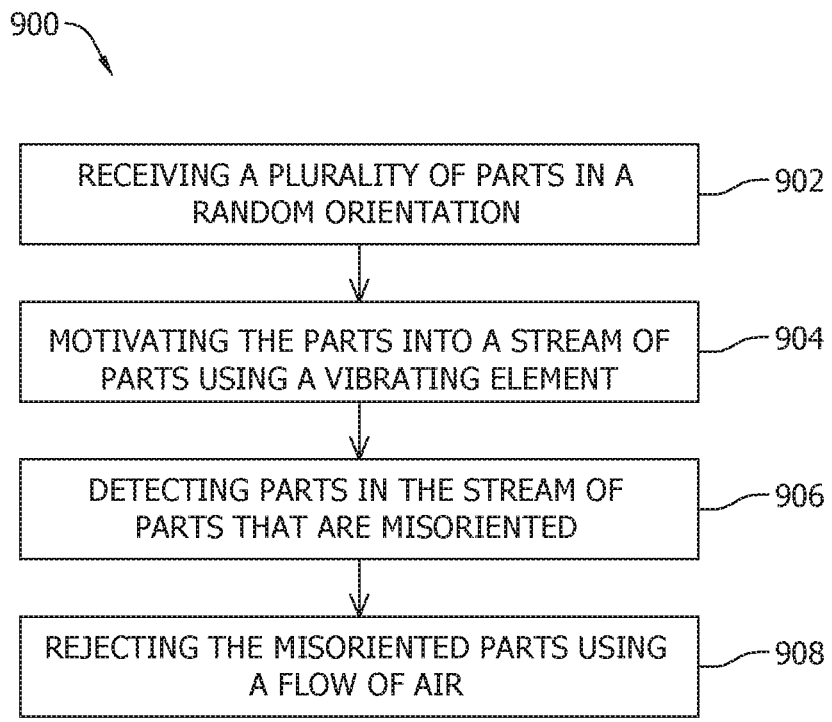

FIG. 9 is a flow chart of an exemplary method 900 of automatically conveying parts in an assembly process. In the exemplary embodiment, method 900 includes receiving 902 a plurality of parts in a random orientation, motivating 904 the parts into a stream of parts using a vibrating element, detecting 906 parts in the stream of parts that are misoriented, and rejecting 908 the misoriented parts using a flow of air. Optionally, method 900 also includes directing the stream of parts through a conveyor using the vibrating element and a flow of air through a nozzle simultaneously wherein the flow of air impinges on the parts in the stream of parts. Method 900 may also include detecting a stoppage of the stream of parts due to a stuck part and directing a flow of air to a location where the stoppage is detected to dislodge the stuck part. Method 900 may further include detecting parts in the stream of parts that are misoriented based on an orientation feature discernible on the part and detecting parts in the stream of parts that are misoriented based on a dimension, a shape, a protuberance, a recess, and combinations thereof. Method 900 may also include detecting parts in the stream of parts that are misoriented based on a visibly discernible feature including at least one of a color, a bar code, and other indicia recognizable by an imaging system.

Exemplary embodiments of an automatic parts conveying system are described above in detail. The automatic parts conveying system, and methods of operating such systems and devices included with such systems are not limited to the specific embodiments described herein, but rather, components of systems and/or steps of the methods may be utilized independently and separately from other components and/or steps described herein. For example, the methods may also be used in combination with other systems requiring highly efficient movement of randomly oriented parts, and are not limited to practice with only the systems and methods as described herein. Rather, the exemplary embodiment can be implemented and utilized in connection with many other machinery applications that are currently configured to receive and accept parts for assembly on a manufacturing line, e.g., and without limitation, robotic systems in automated assembly facilities.

The above-described embodiments of a method and system of conveying parts provides a cost-effective and reliable means for increasing the efficiency of the associated devices and systems. Specifically, to achieve higher total efficiency for feeding parts to a robot feeder, the flow of parts is managed to provide a proper orientation of the parts to the feeder at a reduced rate of manual intervention of the automatic process. More specifically, the methods and systems described herein facilitate detecting and clearing an errant part, for example, when a misorientation of a part and/or a stuck part is detected, automatic parts conveying system is configured to initiate the operation of the air assist portion or to alter its operation to facilitate rejecting misoriented parts and clearing stuck parts from the flow of parts, so normal part flow can be restored. In addition, the above-described methods and systems facilitate maintaining a constant and level flow of parts to the robot parts handler. As a result, the methods and systems described herein facilitate the assembly process in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A parts conveying system comprising:
    a parts feeder configured to receive parts from a receiving bin;
    a linear conveyor for conveying parts along a path extending from said parts feeder to an installation robot;
    one or more vibrating elements positioned along at least one of said linear conveyor, said parts feeder, and said receiving bin to impart vibratory motions to the at least one of said linear conveyor, said parts feeder, and said receiving bin for stimulating the parts into motion, wherein said vibrating elements maintain a higher frequency vibratory motion to maintain the parts moving and switch to a lower frequency and higher power vibratory motion to start a flow of the parts or to dislodge stuck parts; and
    an air assist portion configured to provide pressurized fluid to the parts to facilitate moving parts through said parts conveying system.

2. The automatic parts conveying system of claim 1, wherein said vibrating elements are configured to provide the vibratory motion in at least one of a single direction, a torsional direction, and a random vibratory motion in multiple directions.

3. The automatic parts conveying system of claim 2, wherein said vibrating elements are configured to provide at least one of a constant vibratory motion, an intermittent vibratory motion, and a vibratory motion timed into a distinct pattern.

4. The automatic parts conveying system of claim 2, wherein the vibratory motion is altered in frequency to achieve a predetermined movement of the parts.

5. The automatic parts conveying system of claim 1, wherein said air assist portion includes a plurality of nozzles directed to at least one of an area along the path that has been determined to have flow problems and is detected as having a parts conveying problem.

6. The automatic parts conveying system of claim 5, wherein a part that is detected as being misoriented is rejected to a recycle bin using an air nozzle.

7. The automatic parts conveying system of claim 5, wherein at least one air nozzle is used with at least one of the vibrating elements to dislodge a stuck part.

8. A method of automatically conveying parts in an assembly process, the method comprising:
    receiving a plurality of parts in a random orientation;
    motivating the parts into a stream of parts using a vibrating element;
    detecting parts in the stream of parts that are misoriented based on an orientation feature discernible on the part, including at least one of a color, a bar code, and other indicia recognizable by an imaging system; and
    rejecting the misoriented parts using a flow of air.

9. The method of claim 8, further comprising directing the stream of parts through a conveyor using said vibrating element and a flow of air through a nozzle simultaneously, the flow of air impinging on the parts in the stream of parts.

10. The method of claim 8, further comprising:
    detecting a stoppage of the stream of parts due to a stuck part; and
    directing a flow of air to a location where the stoppage is detected to dislodge the stuck part.

11. The method of claim 8, wherein detecting parts in the stream of parts that are misoriented further comprises detecting parts in the stream of parts that are misoriented based on a dimension, a shape, a protuberance, a recess, and combinations thereof.

12. An assembly line comprising:
    a linear conveyor for conveying parts along a path to an installation robot;
    one or more vibrating elements positioned along said linear conveyor for imparting vibratory motions to said linear conveyor for stimulating the parts into a stream having linear motion along said linear conveyor, wherein the vibratory motions are altered in frequency to achieve a predetermined movement of the parts, wherein said vibrating elements maintain higher frequency vibratory motions to maintain the parts moving and switch to a relatively lower frequency and relatively higher power vibratory motions to start a flow of the parts or to dislodge stuck parts; and
    an air assist portion configured to provide pressurized fluid to the parts to facilitate moving parts along said linear conveyor.

13. The assembly line of claim 12, wherein said installation robot comprises:
    a robot arm controlled by a controller; and
    a parts handling device coupled to a distal end of said robot arm.

14. The assembly line of claim 12, wherein said air assist portion includes a plurality of nozzles directed to at least one of an area along the path that has been determined to have flow problems and is detected as having a parts conveying problem.

15. The assembly line of claim 12, wherein a part that is detected as being misoriented is rejected to a recycle bin using an air nozzle.

16. The assembly line of claim 12, wherein at least one air nozzle is used with at least one of the vibrating elements to dislodge a stuck part.

\* \* \* \* \*